United States Patent [19]

Miyazawa et al.

[11] Patent Number: 5,739,651
[45] Date of Patent: Apr. 14, 1998

[54] APPARATUS AND METHOD FOR DRIVING AND CONTROLLING BRUSHLESS MOTOR

[75] Inventors: Tadashi Miyazawa; Toshiyuki Teshigawara, both of Isesaki, Japan

[73] Assignee: Sanden Corp., Isesaki, Japan

[21] Appl. No.: 669,913

[22] Filed: Jun. 25, 1996

[30] Foreign Application Priority Data

Jun. 26, 1995 [JP] Japan .................... 7-159603

[51] Int. Cl.⁶ ...................... H02P 6/02
[52] U.S. Cl. ............... 318/439; 318/453; 318/254; 388/813
[58] Field of Search ................ 318/439, 603, 318/254, 138, 802, 803, 248, 500, 720, 452, 453; 388/812, 813

[56] References Cited

U.S. PATENT DOCUMENTS

| | | | |
|---|---|---|---|
| 5,319,289 | 6/1994 | Austin et al. | 318/254 |
| 5,461,293 | 10/1995 | Rozman et al. | 318/603 |
| 5,619,109 | 4/1997 | Cameron et al. | 318/254 |
| 5,640,073 | 6/1997 | Ikeda et al. | 318/439 |

*Primary Examiner*—John W. Cabeca
*Attorney, Agent, or Firm*—Kenjiro Hidaka

[57] ABSTRACT

A brushless dc motor having 3-phase stator windings and a permanent-magnet rotor is driven on a dc voltage through a 3-phase electronic switching circuit. Back emf voltages across the stator windings are individually phase-delayed and the phase-delayed voltages are individually compared in comparators with a common sawtooth-wave comparator reference voltage having a frequency proportional to a current rotor speed and an amplitude whose center voltage is one-half of the motor driving dc voltage. A drive control unit, a microcomputer, transmits to the switching circuit switching control signals in sequential driving steps according to 3-phase output signals of the comparators so that the switching circuit performs commutation of the motor drive voltage in a first motor driving mode. The time constant of the phase-delay circuits is increased when the rotational speed of the rotor is below a predetermined speed or the motor driving current is above a predetermined level. When the time constant is increased, the motor driving mode is switched from the first motor driving mode to a second motor drive mode for a predetermined time period at fixed driving steps regardless of the 3-phase comparator output signals. The motor driving mode reverts to the first motor driving mode when the predetermined time period for the second motor driving mode has lapsed.

3 Claims, 9 Drawing Sheets

"ON" State Timings of Switching Elements

APPARATUS AND METHOD FOR DRIVING AND CONTROLLING BRUSHLESS MOTOR

BACKGROUND OF THE INVENTION

1. Field of the Invention

This invention relates to an apparatus and method for driving and controlling a small brushless dc motor particularly having 3-phase stator windings and a permanent-magnet rotor. The apparatus has a solid-state switching circuit that electronically commutates dc power to sequentially energize the stator windings. The timings for the commutation switchings are primarily determined by the angular positions of the rotor that are electronically detected from the back emit voltages across the stator windings induced by the revolving rotor without utilizing any physical angular position sensor.

2. Description of the Prior Art

One of such brushless motor units is described in U.S. Pat. No. 5,640,073, that is commonly assigned to the assignee of the present application.

The brushless motor has Y-connected 3-phase stator windings and a permanent-magnet rotor. A dc voltage is provided to a solid-state electronic switching circuit to be converted to 3-phase voltages that are individuality provided to the 3-phase stator windings. The switching circuit consists of six solid-state switching elements (e.g. IGBT) having respective control terminals that are individually connected to six switching control outputs of a control unit. The switching elements are turned on and off by switching control signals transmitted from the control unit at specific rotor angles. The switching sequence is arranged to cause the stator windings to produce a rotating magnetic flux that interacts with the flux produced by permanent magnets on the rotor so as to rotate the rotor in synchronism with the rotating magnetic field.

Back emf voltages across the 3-phase stator windings are individually provided to 3-phase phase-delay filter circuits so that the phase angle of each voltage is delayed by an electrical angle smaller than 90° thereby. The phase-delayed output voltages of the phase-delay filter circuits are individually provided to the positive input terminals of voltage comparators. To the negative input terminals of the voltage comparators is commonly provided a sawtooth-wave comparator reference voltage, which is an output of a comparator reference voltage computation circuit, having a frequency proportional to a current rotor speed and an amplitude whose center voltage is one half of the dc power supply voltage. The control unit receives 3-phase output voltages of the comparators and, in reference thereto, transmits switching control signals to the switching elements so as to control the switching circuit.

The control unit monitors the rotor speed from the frequency of the 3-phase comparator output voltages. And when the monitored speed becomes smaller than a predetermined value, the time constant of the phase-delay filter circuits is increased to prevent a possible rotor trip-off due to a low rotational speed.

(Problems Pertaining to the Conventional Motor to be Solved by the Present Invention)

In the brushless motor as described above, the signal representing the angular position of the rotor is obtained by comparing the phase-delayed output voltages of the phase-delayed filter circuits with the comparator reference voltage, which is an output of a comparator reference voltage computation circuit. However, if the time constant of the filter circuits is changed responsive to the variation of the rotational speed of the rotor, the change of the time constant causes changes of the wave forms and the slopes of the phase-delayed output voltages of the phase-delayed filter circuits. Then, the timings when the levels of the phase-delayed output voltages and the level of the comparator reference voltage become even will transiently shift. Such shiftings of the timings make it difficult to detect a precise current angular position of the rotor, thereby resulting in undesirable time shiftings of the driving steps (i.e. switching steps) of the electronic switching circuit. The driving steps, then, will deviate from properly regulatable electric angle ranges, and the switching circuit will be subjected to excessive currents. In order to cope with such excessive currents, the switching circuit will have to be of an undesirably large capacity, whereby the size and cost of the switching circuit will have to be increased.

SUMMARY OF THE INVENTION

It is therefore an object of the present invention to provide an apparatus and method for driving and controlling a brushless dc motor, which includes a solid-state switching circuit and phase-delay filter circuits, in which the switching circuit and the motor are not subjected to excessive driving currents when the time constant of the phase-delay circuits is changed.

In order to achieve the above object, the brushless dc motor to be driven includes 3-phase stator windings having respective winding terminals and a permanent-magnet rotor. The apparatus includes a dc power supply, an electronic switching circuit, 3-phase phase-delay filter circuits, 3-phase voltage comparators, a comparator reference voltage computation circuit, a drive control unit, which is a microcomputer, and a current meter. The dc power supply provides a motor drive voltage and a midpoint voltage that is one half of the motor drive voltage. The electronic switching circuit is connected to the dc power supply for switching the motor drive voltage to produce 3-phase dc voltages that are applied to the 3-phase stator windings individually. Three-phase back emf voltages induced across the 3-phase stator windings, while the rotor is in rotation, are individually provided to the 3-phase phase-delay circuits so as to delay phases of the 3-phase back emf voltages by an electric angle of less than 90° so that 3-phase phase-delayed voltages are obtained therefrom.

Each of the 3-phase voltage comparators has a first input terminal, a second input terminal and an output terminal, and the 3-phase phase-delayed voltages are individually provided to the first input terminals. The comparator reference voltage computation circuit outputs a sawtooth-wave comparator reference voltage having a frequency proportional to a current angular speed of the rotor and an amplitude whose center voltage is equal to the above mentioned midpoint voltage. The comparator reference voltage is commonly provided to all of the second input terminals of the voltage comparators so as to obtain 3-phase comparator output voltages from the comparators. The 3-phase comparator output voltages are individually provided to the drive control unit. In the drive control unit are obtained switching control signals in sequential driving steps having driving step time periods according to the 3-phase comparator output voltages. The switching control signals in sequential driving steps are provided to the electronic switching circuit so that the electronic switching circuit performs commutation of the motor drive voltage in a first motor driving mode. On the other hand, in the drive control unit, a rotational speed of the rotor is obtained from the 3-phase comparator output voltages, and an amount of motor drive current supplied from the dc power supply and measured by the current meter is monitored. The time constant of all of the phase-delay filter circuits is increased when the rotor speed is below a predetermined speed and/or the motor drive current is above a predetermined amount.

Datum of each of the driving step time periods is stored consecutively in a refreshing manner in a memory unit in the control drive unit. When the time constant of the phase-delay filter circuits is increased, the last step time period stored in the memory unit is timed by a driving step period timer in the control drive unit. The last step time period is multiplied by a predetermined number of steps to obtain a time period for a second motor driving mode.

When the time constant is increased, motor driving mode is switched from the first motor driving mode, which is dependent of the 3-phase comparator output voltages, to a second motor drive mode, which is independent of the 3-phase comparator output voltages, for the time period calculated for the second motor driving mode. The drive control unit provides switching control signals in sequential driving steps for the second motor driving mode to the electronic switching circuit so that the electronic switching circuit performs commutation of the motor drive voltage in the second motor driving mode. In the second motor driving mode, each of the sequential driving steps has a time period that is equal to the last step time period stored in the memory unit. The motor driving mode reverts from the second motor driving mode to the first motor driving mode when the time period for the second motor driving mode has lapsed.

In an alternative embodiment according to the present invention, when the time constant of the phase-delay filter circuits is increased, motor driving mode is switched from the first motor driving mode, as described above, to a modified second motor drive mode, which is also independent of the 3-phase comparator output voltages, for a time period that equals to a predetermined driving step period multiplied by a predetermined number of driving step. Then, the driving mode reverts to the first motor driving mode after the time period for the modified second mode has lapsed. The drive control unit provides switching control signals in sequential driving steps, each time period of which is fixed for the modified second motor driving mode, to the electronic switching circuit so that the electronic switching circuit performs commutation of the motor drive voltage in the modified second motor driving mode.

DETAILED DESCRIPTION OF THE PREFERRED EMBODIMENTS

The present invention will now be described in detail with reference to the drawings.

Figure 1:
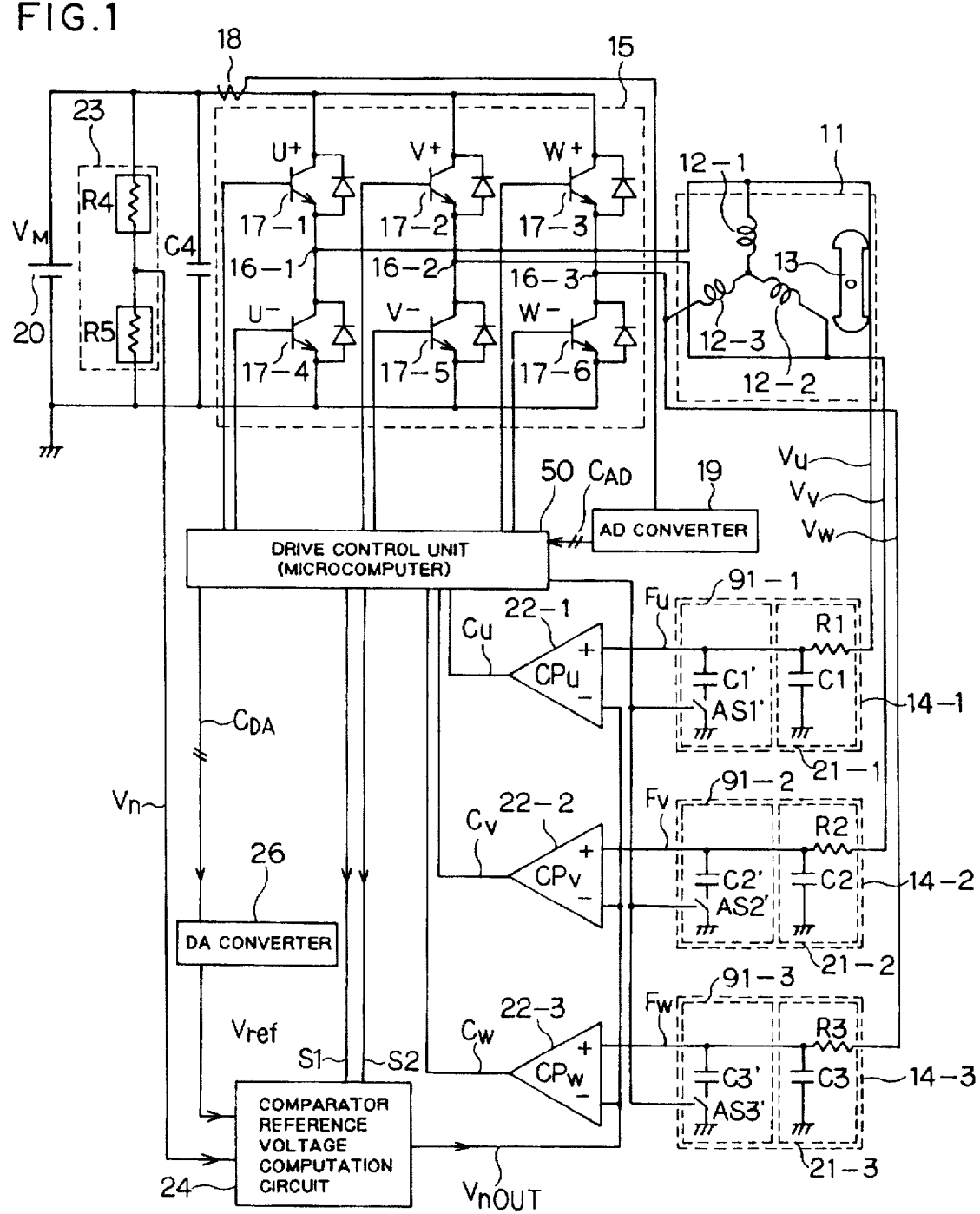
FIG. 1 is a circuit diagram of a brushless dc motor and an apparatus for driving and controlling the motor according to the basic embodiment of the present invention.

FIG. 1 is a circuit diagram of a brushless dc motor and an apparatus for driving and controlling the motor according to the basic embodiment of the present invention. A brushless dc motor 11 primarily consists of Y-connected 3-phase stator windings 12-1, 12-2, 12-3 and a permanent-magnet rotor 13. An electronic switching circuit (i.e. an electronic commutation circuit) 15 has three pairs of bridge-connected solid-state switching elements (i.e. transistors) 17-1,4 (U-phase), 17-2,5 (V-phase) and 17-3,6 (W-phase), each switching element having a control terminal that is individually connected to each of six control outputs of a drive control unit (a microcomputer) 50. The three pairs of the switching elements 17-1–6 have respective output terminals 16-1, 16-2 and 16-3 that are connected to the terminals of the stator windings 12-1, 12-2, 12-3, respectively. A dc voltage VM Of a dc power supply 20, with a grounded negative terminal, is applied to each of the three pairs of the switching elements as shown.

The terminal voltages Vu, Vv and Vw, which are back emf voltages induced by the rotor 13 in rotation, of the 3-phase stator windings 12-1, 12-2 and 12-3, respectively, are provided to phase-delay filter circuits 14-1, 14-2 and 14-3, respectively, and phase angle in each circuit is delayed thereby by an electrical angle of approximately 60° in this particular embodiment. But it is also permissible if the delay angle is less than 90° but more than 30° The phase-delay filter circuits 14-1, 14-2 and 14-3 consist of main filter circuits 21-1, 21-2 and 21-3, respectively, and time constant increase circuits 91-1, 91-2 and 91-3, respectively. The main filter circuits 21-1, 21-2 and 21-3 consist of resistors R1, R2 and R3, respectively, connected in series to the terminals of the stator windings 12-1, 12-2 and 12-3, respectively, and capacitors C1, C2 and C3, respectively, connected in parallel between the outputs of the respective resistors and ground. The time constant increase circuits 91-1, 91-2 and 91-3 include capacitors C1', C2' and C3', respectively, which are connected in parallel with the capacitors C1, C2 and C3, respectively, and on-off switches AS1', AS2' and AS3', respectively, that are serially connected to the capacitors C1', C2' and C3', respectively, and ground. The on-off switches AS1', AS2' and AS3' are normally in the off position so that the time constant increase circuits 91-1, 91-2 and 91-3 are normally kept disabled. The on-off switches AS1', AS2' and AS3' will be turned on so that the time constant increase circuits 91-1, 91-2 and 91-3 are enabled upon receiving a time constant increase signal from the drive control unit 50, as will be discussed in detail later. The output terminals of the phase-delay filter circuits 14-1, 14-2 and 14-3 are the common connecting points of R1/C1/C1', R2/C2/C2', and R3/C3/C3', respectively.

The phase-delay filter circuits 14-1, 14-2 and 14-3 output phase-delayed output voltages Fu, Fv and Fw, respectively, that are provided to the positive input terminals of voltage comparators 22-1, 22-2 and 22-3, respectively.

The voltage VM across the dc power supply 20 is divided in half by a voltage divider 23, which consists of a pair of resistors R4 and R5, so as to produce a midpoint voltage Vn. The midpoint voltage Vn is provided to a comparator reference voltage computation circuit 24. The comparator reference voltage computation circuit 24 performs an arithmetic-logic operation in reference to the midpoint voltage Vn, as will be described in detail later, so as to output a sawtooth-wave comparator reference voltage VnOUT that is commonly provided to all of the negative input terminals of the voltage comparators 22-1, 22-2 and 22-3. In addition to the midpoint voltage Vn, to the comparator reference voltage computation circuit 24 are individually provided a basic reference voltage Vref from a DA converter 26 and a pair of switch on-off signals S1 and S2 from the drive control unit 50. Explanation will be made in detail later as to the basic reference voltage Vref and the switch on-off signals S1 and S2.

Figure 2:
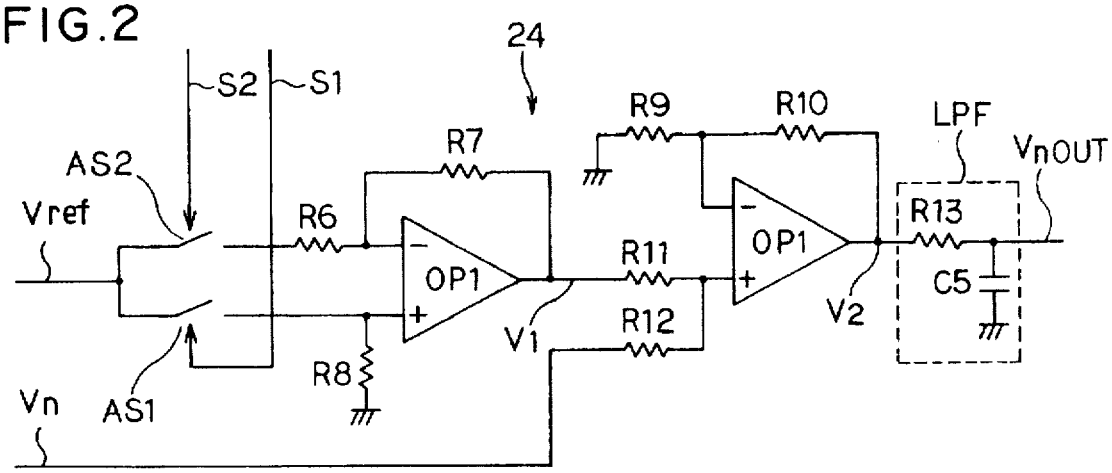
FIG. 2 is a detailed schematic diagram of a comparator reference voltage computation circuit shown in FIG. 1.

FIG. 2 is a detailed schematic diagram of the comparator reference voltage computation circuit 24. The basic reference voltage Vref is commonly provided to a pair of on-off switches AS1 and AS2 connected in parallel. The switches AS1 and AS2 are alternately turned on and off at a frequency proportional to a current rotor speed by the pair of switch on-off signals S1 and S2, respectively, transmitted from the drive control unit 50 (FIG. 1), so that the outputs of the switches AS1 and AS2 are alternately nil or the basic reference voltage Vref itself. The output of the switch AS1 is provided to the positive (non-inverting) input terminal of a first operation amplifier OP1 and the output of the switch AS2 is provided to the negative (inverting) input terminal of the first operation amplifier OP1.

Three resistors R6, R7 and R8, each having an identical resistance value, are connected to the first operation amplifier OP1 as shown. Since the resistance value of the resistors R6, R7 and R8 are all the same, when the switch AS1 is "ON" (the switch AS2 is "OFF") the first operation amplifier OP1 will function as a non-inverting amplifier having an amplification factor 1, whereby an output voltage V1 thereof will be the basic reference voltage Vref itself. Conversely, when the switch AS2 is "ON" (the switch AS1 is "OFF") the first operation amplifier OP1 will function as an inverting amplifier having an amplification factor 1, whereby the output voltage V1 thereof will be an inverted basic reference voltage, i.e. −Vref.

The output voltage V1 of the first operation amplifier OP1 and the midpoint voltage Vn are provided to the positive input terminal of a second operation amplifier OP2. Four resistors R9, R10, R11 and R12, each having an identical resistance value, are connected to the second operation amplifier OP2 as shown. Since the resistance values of the resistors R9, R10, R11 and R12 are all the same, the second operation amplifier OP2 functions as a voltage summing amplifier with the voltages V1 and Vn being the input voltages to be summed up. An output voltage V2 of the second operation amplifier OP2 is provided to a low-pass filter LPF, which consists of a resistor R13 and a capacitor C5, so that the above mentioned sawtooth-wave comparator reference voltage VnOUT is outputted therefrom.

Figure 3:
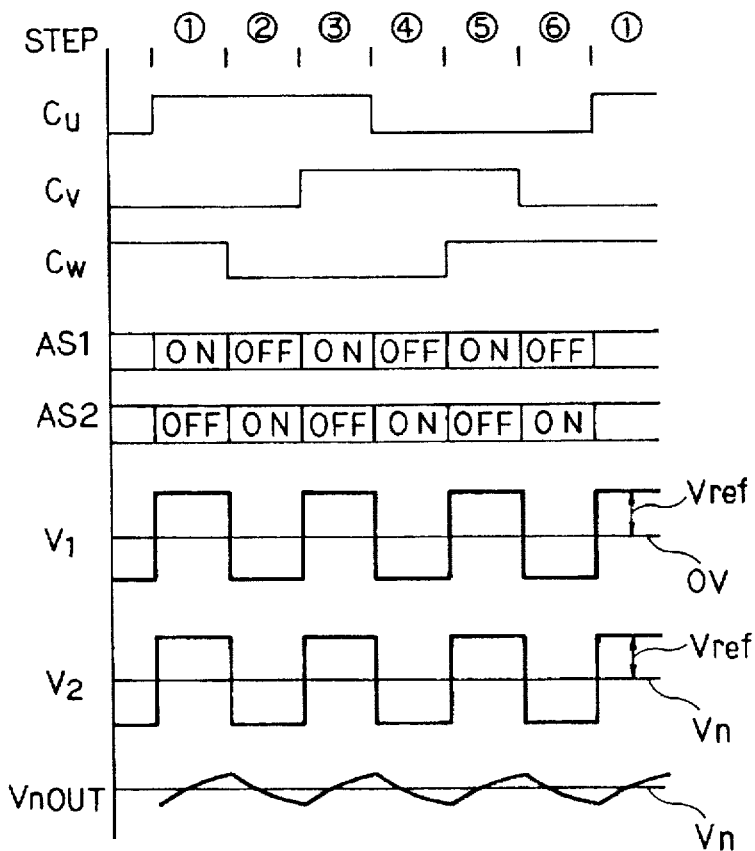
FIG. 3 is a waveform diagram that will help explain the function of the comparator reference voltage computation circuit shown in FIGS. 1 and 2.

FIG. 3 is a waveform diagram that will help explain the function of the comparator reference voltage computation circuit 24 of FIG. 2. The six serial steps (1)–(6), denoted by the word "STEP", constitute one electrical cycle period (i.e. 360° electrical angle) that corresponds to one energizing cycle period of the 3-phase stator windings. The rotor 13 keeps rotation synchronously with the revolving magnetic flux as the 6-step cycle is repeated. In this case, the sawtooth-wave comparator reference voltage VnOUT has a cycle period that equals to one third of the cycle period (i.e. three times in frequency) of the terminal voltages Vu, Vv and Vw of the stator windings 12-1, 12-2 and 12-3, respectively, or the cycle period for energizing the 3-phase stator windings.

In FIG. 3, "Cu", "Cv" and "Cw" represent the waveforms of the output voltages of the voltage comparators 22-1, 22-2 and 22-3, respectively, shown in FIG. 1. The cycle period, or the frequency, of the output voltages Cu, Cv and Cw is identical to that of the winding terminal voltages Vu, Vv and Vw. The switchings from one step to the succeeding step for the steps (1)–(6) are performed by the drive control unit 50 in reference to the waveforms Cu, Cv and Cw with a frequency proportional to the rotor's angular speed. "AS1" and "AS2" represent the timings of the ON/OFF states of the switches AS1 and AS2, respectively, that alternately occur in synchronism with the steps (1)–(6). "V1" represents a waveform of the output voltage V1 of the first operation amplifier OP1, which is a rectangular waveform having a 2-times Vref amplitude with a center voltage grounded and a cycle period being equal to a 2-step time period. "V2" represents a waveform of the output voltage V2 of the second operation amplifier OP2, which has the same waveform, the same amplitude and the same cycle period as those of the output voltage V1, but a center voltage of the amplitude being Vn. In other words, the voltage V2 is a voltage of V1 shifted up by Vn. The comparator reference voltage VnOUT has the same center voltage (Vn) and the same cycle period as those of the voltage V2.

FIGS. 4(A)–(E) shows voltage waveforms at parts of the circuitry shown in FIG. 1 that determine motor driving steps (or, switching steps) and on-off timings of the solid-state switching elements 17-1~6 of the switching circuit 15 in a first motor driving mode. More specifically, FIG. 4(A) shows six motor driving steps (1), (2), (3), (4), (5) and, (6), each step corresponding to a 60° electrical angle and the complete 6-step period corresponds to one energizing cycle for the 3-phase stator windings; FIG. 4(B) shows a waveform of the terminal voltage Vu of the winding 12-1; FIG. 4(C) shows waveforms of the phase-delayed output voltage Fu of the phase-delay filter circuit 14-1 and the comparator reference voltage VnOUT outputted from the comparator reference voltage computation circuit 24; FIG. 4(D) shows a waveform of the output voltage Cu of the voltage comparator 22-1; and FIG. 4(E) shows "ON" state timings of the six solid-state switching elements 17-1(U$^+$), 17-2(V$^+$), 17-3 (W$^+$), 17-4(U$^-$), 17-5(V$^-$) and 17-6(W$^-$).

Figure 4:
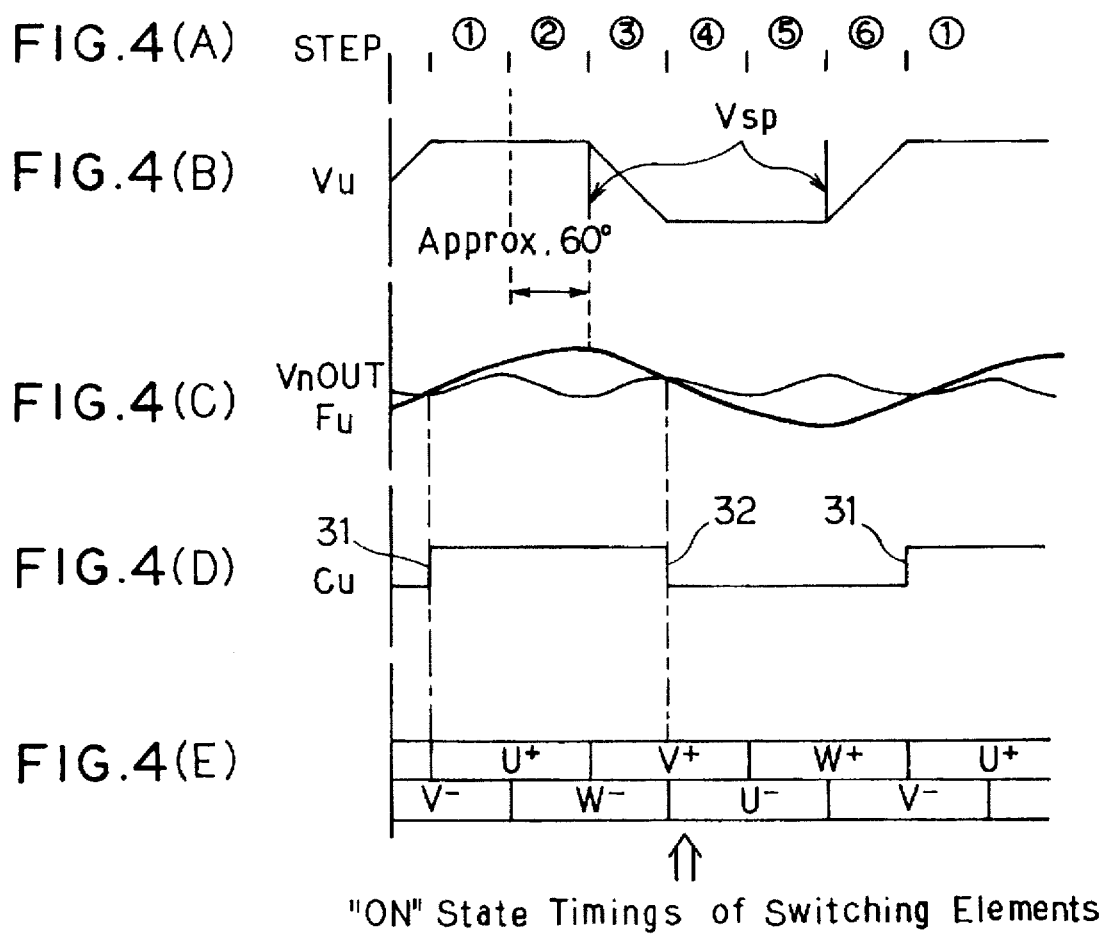
FIGS. 4(A)–(E) show voltage waveforms at parts of the circuitry shown in FIG. 1 that determine switching steps and on-off timings of the solid-state switching circuit shown in FIG. 1 in a first motor driving mode according to the present invention.

The output voltages Fu, Fv and Fw of the phase-delay filter circuits 14-1, 14-2 and 14-3, respectively, are delayed by approximately 60° with respect to the phase angles of the winding terminal voltages Vu, Vv and Vw, respectively. As shown in FIG. 4(B), the winding terminal voltage Vu is of a trapezoidal waveform having spikes of a voltage Vsp at the ends of steps (2) and (5). Such spikes appear in the terminal voltages Vu, Vv and Vw when the corresponding switching elements are turned off, or, in other words, the currents to the respective stator windings 12-1, 12-2 and 12-3 are interrupted by the switching circuit 15. The phase-delayed output voltage Fu, as shown in FIG. 4 (C) of the phase-delay filter circuit 14-1 is compared with the comparator reference voltage VnouT outputted from the comparator reference voltage computation circuit 24 by the voltage comparator 22-1, and the voltage Cu as shown in FIG.4 (D) is outputted from the voltage comparator 22-1. The output voltage Cu has a rectangular waveform that rises or falls as the voltage Fu and the voltage VnOUT come even with each other, as shown in FIG. 4(D) along with FIG. 4(C).

Reference is now made to FIG. 3 along with FIGS. 4(A)–(E). Immediately before the voltage Cu rises at the end of step (6), as indicated by reference numeral 31, the voltages Cu and Cv are at level "0" and the voltage Cw is at level "1", and the switching elements 17-3 (W$^+$) and 17-5(V$^-$) are in "ON" state. As the rotor 13 maintains rotation, and when the voltage Cu turns from level "0" to level "1", step 6 is switched over to step 1. The drive control unit 50 receives this switching information and, simultaneously, the drive control unit 50 transmits switching control signals individually to the switching elements 17-3 (W$^+$) and 17-3 (U$^+$) so as to cause the switching element 17-3 (W$^+$) to be turned "OFF" and 17-3 (U$^+$) to be turned "ON", as will be understood in reference to FIG. 4(E). Simultaneously, the drive control unit 50 causes the switch AS1 to be turned "ON" and the switch AS2 to be turned "OFF", as shown in FIG. 3. Then, at this time, the output voltage VnOUT of the comparator reference voltage computation circuit 24 starts to increase, as seen in FIG. 4(C). Likewise, when the voltage Cu falls at the end of step (3), as indicated by reference numeral 32, the drive control unit 50 transmits switching control signals individually to the switching elements 17-6(W$^-$) and 17-4(U$^-$) so as to cause the switching element 17-6(W$^-$) to be turned "OFF" and 17-4(U$^-$) to be turned "ON", as will be understood in reference to FIG. 4(E).

As described above, the switching control signals provided from the drive control unit 50 to the phase "U" switching elements, for example, to start energizing the phase "U" stator winding 12-1 are obtained from the voltage Cu that is derived from the terminal voltage Vu of the phase "U" stator winding 12-1. Similarly, other switching control signals are produced in the drive control unit 50 responsive to the respective output voltages Cv (phase "V") and Cw (phase "W"), which are derived from the stator winding terminal voltages Vv and Vw, respectively, and transmitted to the control terminals of the corresponding switching elements. Thus, the stator windings 12-1, 12-2 and 12-3 are provided with 3-phase dc voltages, with a shifted phase angle of 120° one another, from the dc power supply 20 by way of the electronic switching circuit 15, and a revolving magnetic flux generated by the 3-phase windings being energized causes the permanent-magnet rotor 13 to be kept rotated.

The drive control unit 50 detects a rotational speed of the rotor 13 from the frequency of the output Cu, Cv or Cw of the voltage comparators 22-1, 22-2 or 22-3, respectively. Then, the drive control unit 50, according to the rotational speed of the rotor 13, transmits a basic reference voltage setting signal C$_{DA}$, to the DA converter 26 so that the DA converter generates an adjusted and optimum basic reference voltage Vref that varies depending on the rotor speed. The basic reference voltage setting signal C$_{DA}$ transmitted to the DA converter 26 causes the basic reference voltage Vref to be large when the rotor speed is large, and small when the rotor speed is small. The increase or decrease of the basic reference voltage Vref causes the amplitude of the sawtooth-wave output voltage VnOUT of the comparator reference voltage computation circuit 24 to be increased or decreased, respectively.

Figure 5:
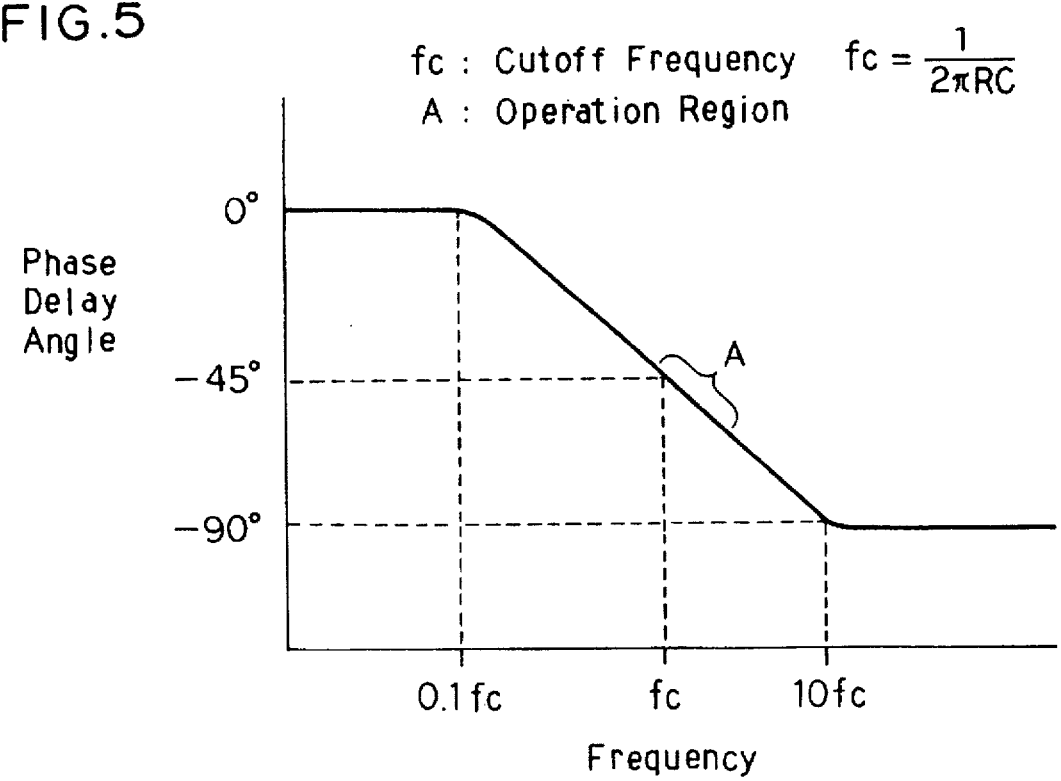
FIG. 5 is a graph showing phase delay angle vs. frequency characteristics of phase-delay filter circuits, such as the ones shown in FIG. 1.

FIG. 5 is a graph showing phase delay angle vs. frequency characteristics of phase-delay filter circuits. In the graph, "fc" represents the cutoff frequency of the phase-delay circuits. (Namely, fc=½πRC) As shown in FIG. 5, the delay angle varies as the frequency varies within a limited frequency range. There is no delay in the frequency range from 0 to 0.1 fc. The delay angle increases from 0° to 90° as the frequency increases from 0.1 fc to 10 fc, but the delay angle remains constant at 90° if the frequency exceeds 10 fc.

Phase-delay filter circuits of a conventional brushless dc motor unit are intended to be used in a frequency range of the saturation region, where the delay angle is 90° constant. The main reason for that is once the R and C values of the phase-delay filter circuits are determined so that the frequency range of the induced winding terminal voltages, which represents the rotor speed range, comes within the saturated region (over 10 fc in FIG. 5), the delay angle can be maintained at 90° constant as long as the rotor speed stays within the intended range, and this leads to a simple circuit structure. However, once the rotor speed (i.e. frequency) is out of the intended operational range and comes down into the non-saturation region, the delay angle becomes smaller than 90°, thereby causing the switching timings to be excessively advanced and the motor control difficult.

Whereas, since the phase-delay filter circuits 14-1, 14-2 and 14-3 are purposely operated with a delay angle smaller than 90°, such as 60°, the operating region, indicated by letter "A" in FIG. 5 is in the linear region (non-saturation region). Therefore within this operating region, the amount of the delay varies depending on the frequency of the output voltages of the phase-delay filter circuits 14-1–3 or of the terminal voltages Vu, Vv and Vw of the stator windings 12-1, 12-2 and 12-3, respectively.

Namely, as the rotor speed increases, the delay angle of the outputs Fu, Fv and Fw of the phase-delay filter circuits 14-1, 14-2 and 14-3, respectively, also increases. This added phase angle delay causes the turn-on timings of the switching elements of the switching circuit 15 to be also delayed with respect to the current angular position of the rotor 13. Therefore, when the rotor speed exceeds a certain speed, the amount of the phase-delay may become excessive and the rotor 13 may consequently trip off. Oppositely, when the motor speed is too slow, the amount of the phase-delay of the outputs Fu, Fv and Fw may become too small, causing the switching timings to be unwanted advanced, and the rotor may likewise trip off. It can be said in this case that the speed range in which the rotor can be run safely and reliably will have to be limited. The following discussion pertains to a solution to such a problem.

The basic reference voltage Vref is made to be increased when the rotor speed is large, and decreased when the rotor speed is small, by the drive control unit 50 and the DA converter 26. The increase or decrease of the basic reference voltage Vref causes the amplitude of the comparator reference voltage VnOUT outputted from the comparator reference voltage computation circuit 24 to be increased or decreased, respectively.

Figure 6:
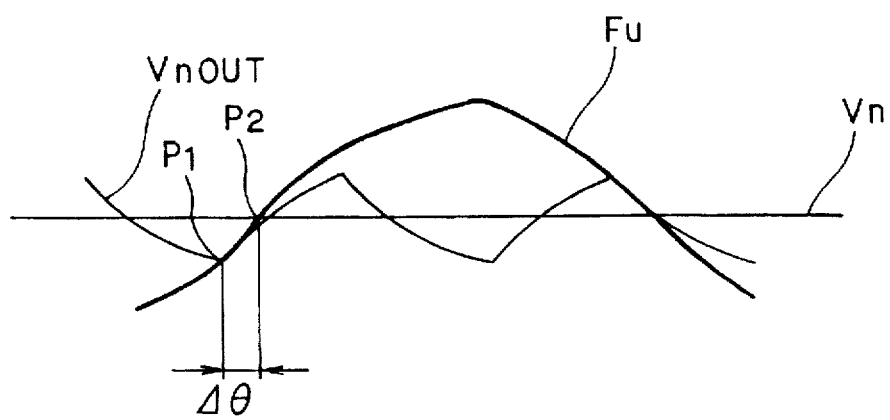
FIG. 6 is a graph showing a correlation between the output voltage of the comparator reference voltage compu-tation circuit and an output voltage of one of the phase-delay filter circuits shown in FIG. 1.

FIG. 6 is a graph showing a correlation between the variation of the amplitude of the comparator reference voltage VnOUT and the shifting of electrical angle where the comparator reference voltage $V_{nOUT}$ becomes even with the output voltage Fu. In reference back to FIGS. 2 an 3, when the basic reference voltage Vref inputted to the comparator reference voltage computation circuit 24 is increased, the output voltages V1 and V2 of the operation amplifiers OP1 and OP2, respectively, are also increased, and, consequently, the amplitude of the filtered sawtooth-wave output voltage, i.e. the comparator reference voltage $V_{nOUT}$, is increased as well. In FIG. 6, "$\Delta\theta$" represents the electrical angle difference between the cross point P1 of the output voltage Fu with the output voltage Vnout (i.e. Fu/Vnout cross point) and the cross point P2 of the output voltage Fu with the midpoint voltage Vn (i.e. Fu/Vn cross point). If the amplitude of the output voltage $V_{nOUT}$ increases the angle difference $\Delta\theta$ will increase because the FU/$V_{nOUT}$ cross point P1 will shift to the left, as FIG. 6 is viewed, and, conversely, if the amplitude of $V_{nOUT}$ decreases the angle difference $\Delta\theta$ will also decrease because the FU/$V_{nOUT}$ cross point P2 will shift to the right. As the angle difference $\Delta\theta$ increases, the rise times of the corresponding comparator output voltage Cu will advance, and then the turn-on timings of the corresponding switching elements will also advance. The same can be said with regard to the phase-delay filter output voltages Fv and Fw, the comparator output voltages Cv and Cw, and the turn-on timings of the corresponding switching elements. Therefore, by regulating the amplitude of the basic reference voltage Vref according to the rotational speed of the rotor 13, adjusted "ON" timings of the switching circuit 15 can be obtained.

A current meter 18 is installed in the power supply line on the positive side of the dc power supply 20. The current meter 18 measures the current in the line and outputs an analogue signal to an AD converter 19, where the amount of measured current is converted to a digital signal CAD, which is transmitted to the drive control unit 50. Thus, the drive control unit 50 monitors the amount of the currents supplied from the dc power supply 20 to the stator windings 12-1, 12-2 and 12-3 by way of the switching circuit 15. Then, when the amount of the currents monitored by the drive control unit 50 exceeds a predetermined upper value, the drive control unit 50 transmits a control signal CDA to the DA converter 26 to decrease the value of the basic reference voltage Vref. Conversely, when the amount of the currents is less than a predetermined lower value, the drive control unit 50 transmits a control signal CDA to the DA converter 26 to increase the value of the basic reference voltage Vref.

Whereas, in a conventional brushless dc motor, when the motor drive currents increase, the turn-on timings of the solid-state switching elements advance for the reason that will be mentioned below. This phenomenon makes it difficult to maintain an efficient operation of the motor, and that may further lead to a rotor trip-off problem. In a conventional brushless dc motor, spikes appear in the terminal voltages of stator windings, as exemplified by spike voltage Vsp of the stator terminal voltage Vu shown in FIG. 4(B). The pulse widths of such spikes increase as the motor drive currents increase. Such increased spike pulse widths cause to minimize the amount of delay of the outputs of the phase-delay filter circuits. A solution to such a problem is to adjust the value of the basic reference voltage Vref according to the amount of the motor drive currents. In other words, adjusted turn-on timings can be obtained depending on the variation of the motor drive currents.

As mentioned above, the time constant increase circuits 91-1, 91-2 and 91-3 are provided between the output terminals of the main filter circuits 21-1, 21-2 and 21-3, respectively, and the positive input terminals of the comparators 22-1, 22-2 and 22-3, respectively. The drive control unit 50 can transmit a common switch control signal (or, a time constant increase signal) to all of the on-off switches AS1', AS2' and AS3' simultaneously so as to turn on or off the switches, thereby enabling or disabling the capacitors C1', C2' and C3'.

As mentioned above, the phase delay angle of the phase-delay filter circuits is less than 90°, i.e. approximately 60°. Therefore, as explained above in reference to FIG. 5, when the rotor speed decreases (i.e. the frequency decreases:) the delay angle of the main filter circuits 21-1, 21-2 and 21-3 becomes smaller, thereby decreasing the phase delay angle of the voltages having passed the phase-delay filter circuits 14-1, 14-2 and 14-3, provided that the time constant increase circuits 91-1, 91-2 and 91-3 are disabled. Such decrease of the phase delay angle can be compensated by decreasing the value of the basic reference voltage Vref as long as the rotor speed is within a normal range. However, when the rotor speed is low, such as less than 1,000 rpm, even if the basic reference voltage Vref is made zero, there is a possibility that no proper compensation to phase delay can be made, and the rotor may consequently trip off.

In view of such a problem, the drive control unit 50 monitors the rotor speed from the frequency of the voltage Cu, Cv, or Cw, and when the monitored rotor speed becomes smaller than a predetermined value, the drive control unit 50 transmits a time constant increase signal to cause the switches AS1', AS2', and AS3' to be closed, thereby enabling the time constant increase circuits 91-1, 91-2 and 91-3. Then, the time constant and the amount of phase delay of the phase-delay circuits 14-1, 14-2 and 14-3 will be increased, so that the possible rotor trip-off at a low speed can be prevented.

Figure 7:
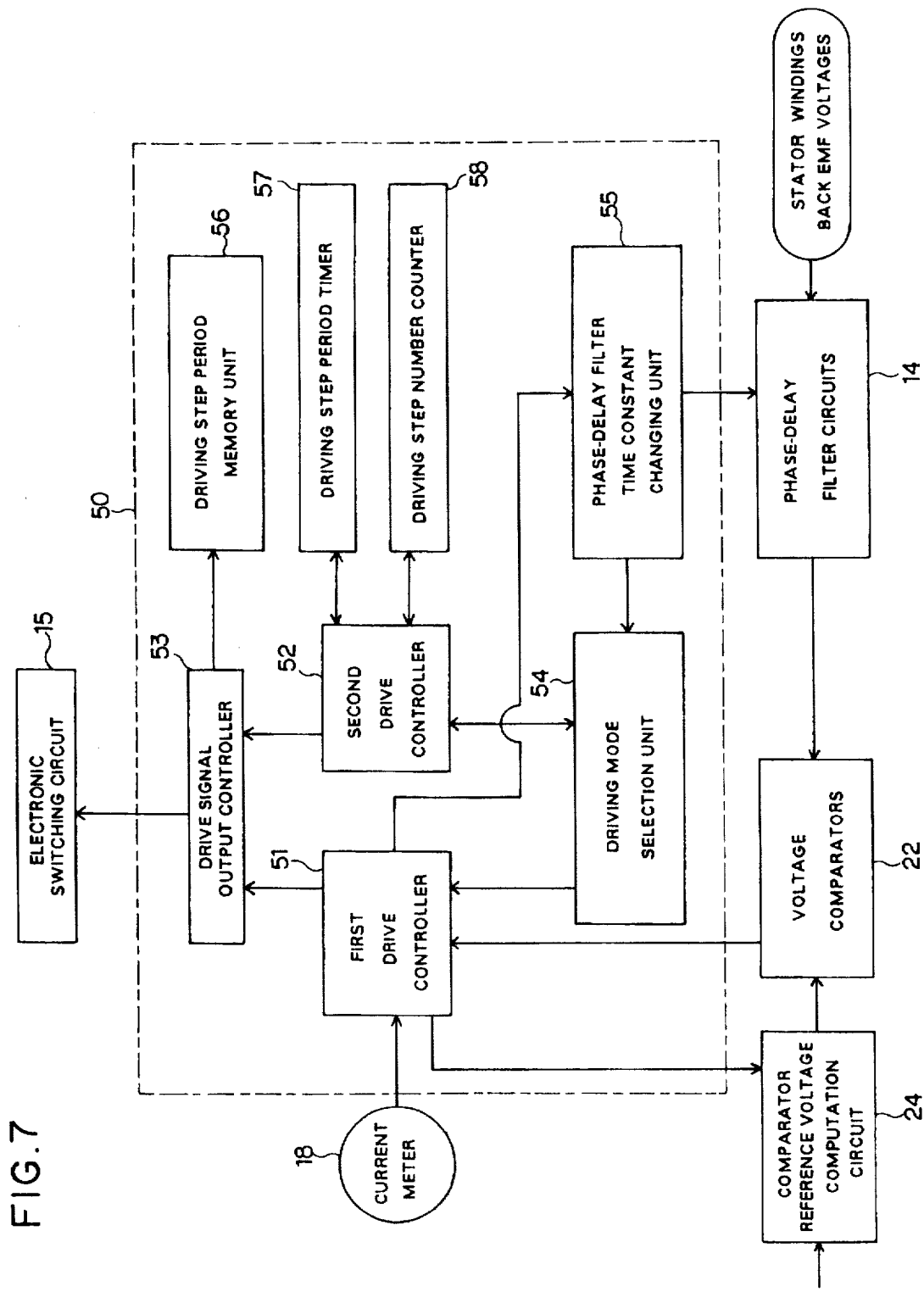
FIG. 7 is a block diagram of an improved apparatus for driving and controlling a brushless dc motor according to the present invention.

FIG. 7 is a block diagram of an improved apparatus for driving and controlling a brushless motor according to the present invention. FIG. 1 particularly shows details of the drive control unit 50 of the present invention. Between FIG. 1 and FIG. 7, the same reference numerals denote the same electrical devices or components having the same functions that have already been explained above. Therefore, no duplicate explanation will be made here on the devices shown in FIG. 7 if the devices are also shown in FIG. 1. The reference numeral "14" in FIG. 7 collectively represents the phase-delay filter circuits 14-1, 14-2 and 14-3 as shown in FIG. 1, and the reference numeral "22" in FIG. 7 collectively represents the comparators 22-1, 22-2 and 22-3 as shown in FIG. 1.

The drive control unit 50 includes a first drive controller 51, which is a primary drive controller, a second drive controller 52, a drive signal output controller 53, a driving mode selection unit 54, a phase-delay filter time constant changing unit 55, a driving step period memory unit 56, a driving step period timer 57, and a driving step number counter 58.

Referring back to FIG. 1, the voltage comparators 22 individually output signals Cu, Cv and Cw representing current angular positions of the revolving rotor by comparing the phase-delayed output voltages of the phase-delay circuits 14 with the comparator reference voltage, i.e. the output voltage of the comparator reference voltage computation circuit 24.

The output signals Cu, Cv and Cw of the voltage comparators 22 are provided to the first drive controller 51 according to the present invention. The drive current signal CAD representing the amount of total motor drive current measured by the current meter 18 is also provided to the first drive controller 51.

The first drive controller 51, while being selected by the driving mode selection unit 54, provides a first drive control signal to the drive signal output controller 53, which in turn controls on-off switchings of the solid-state switching circuit 15 in a first motor driving mode according to the first drive control signal provided from the first drive controller 51. Therefore, in the first motor driving mode, the motor driving steps, which are the switching steps of the solid-state switching circuit 15, are determined according to the output signals Cu, Cv and Cw of the voltage comparators 22, as described above. The first drive controller 51 also provides data on the amount of the total drive current measured by the current meter 18 and a current rotational speed of the rotor 13 to the phase-delay filter time constant changing unit 55. The phase-delay filter time constant changing unit 55 transmits a time constant change signal to the phase-delay circuits 14 if the amount of the total drive current exceeds a predetermined maximum level. The phase-delay filter time constant changing unit 55 also transmits a time constant change signal to the phase-delay circuits 14 if the rotational speed of the rotor 13 is below a predetermined minimum speed. The time constant change signal, when transmitted from the phase-delay filter time constant changing unit 55, causes the on-off switches AS1', As2' and AS3' to be closed and thereby the time constant increase circuits 91-1, 91-2 and 91-3 to be enabled so that the time constant of the phase-delay filter circuits 14 is increased.

The second drive controller 21, if selected by the driving mode selection unit 54, provides a second drive control signal to the drive signal output controller 53, which in turn controls on-off switchings of the solid-state switching circuit 15 in a second motor driving mode according to the second drive control signal provided from the second drive controller 52. Either the first drive controller 51 or the second drive controller 52 is selected at a time by the driving mode selection unit 54, and the selected controller, either 51 or 52, transmits the switching control signal to the drive signal output controller 53. The phase-delay filter time constant changing unit 55 also provides the time constant change signal to the driving mode selection unit 54, in addition to the phase-delay filter circuits 14. The time constant change signal causes the driving mode selection unit 54 to switch selection of the drive controller from the first drive controller 51 to the second drive controller 52 so that the drive signal output controller 53 to be switched from the first motor driving mode to the second motor driving mode so as to drive the solid-state switching circuit 15 in the second motor driving mode on a specified driving step and for a specified time period, which will be discussed in detail later.

As mentioned before, the drive control unit 50 also includes the driving step period memory unit 56, the driving step period timer 57, and the driving step number counter 58. The control signal transmitted from the drive signal output controller 53 to the solid-state switching circuit 15 is also provided to the driving step period memory unit 55 so that the driving step period memory unit 55 stores datum of the time period of one driving step, or one switching step, of the control signal transmitted from the drive signal output controller 53 to the solid-state switching circuit 15 for driving the brushless motor. The datum of the driving step time period stored in the driving step period memory unit 56 is always refreshed so that the stored datum is of the latest driving step transmitted from the drive signal output controller 53. As will be discussed later, the driving step period timer 57 reads the driving step time period from the driving step period memory unit 56 and performs timing for the driving step time period. In other words, the driving step period timer 57 times exactly the same driving step time period of the control signal transmitted from the drive signal output controller 53 to the switching circuit 15, which is stored in the driving step period memory unit 56. The driving step number counter 58 counts a predetermined number of driving steps having the driving step period timed and set in the driving step period timer 57. The second drive controller 52 performs a second drive control in the second motor driving mode only for a time period (hereinafter identified as "T2") that equals to the one-step time period (hereinafter identified as "Ts") timed and set in the driving step period timer 57 multiplied by the predetermined number (hereinafter identified as "Ns") of steps set in the driving step number counter 58. The exemplified number (Ns) of steps set in the driving step number counter 58 is three (3), as explained later. Namely:

$$T2 = Ts \times Ns$$

Where:
T2: Time period of second motor driving mode
Ts: Time period of one driving step for the second motor drive mode, which is timed and set in the driving step period timer 57
Ns: Number of steps set in the driving step number counter 58 for the second motor driving mode e.g. "3")

As soon as the time period (T2) for the second. motor driving mode has lapsed, the second drive controller 52 transmits a count-up signal to the driving mode selection unit 54 that in turn causes to select the first drive controller 51, thus the driving mode reverts to the first motor driving mode.

Figure 8:
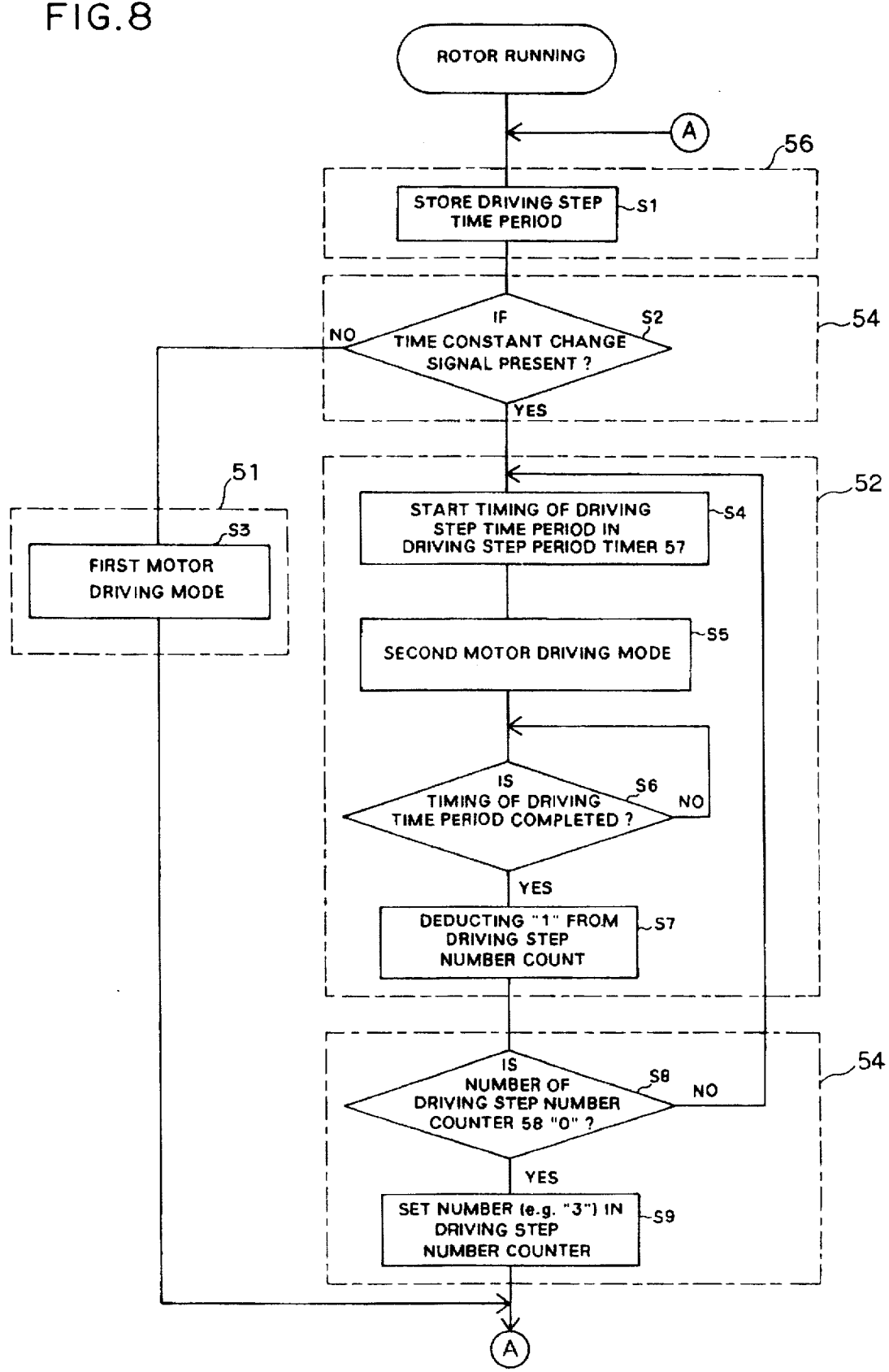
FIG. 8 is a flow chart showing the function of a drive control unit shown in FIGS. 1 and 7.

FIG. 8 is a flow chart showing the function of the drive control unit 50 shown in FIGS. 1 and 7. While the rotor 13 is running, in Step 1 (S1), the driving step time period (Ts) for driving the brushless motor 11 is stored in the driving step period memory unit 56. if, in Step 2 (S2), no time constant change signal from the phase-delay filter time constant changing unit 55 is detected by the driving mode selection unit 54, the first drive controller 17 is kept selected so that the first motor driving mode is maintained (Step 3 (S3)). If, in Step 2 (S2), the time constant change signal from the phase-delay filter time constant changing unit 55 is detected by the driving mode selection unit 54, the second drive controller 52 is selected, then the driving step period timer 57 reads the driving step time period (Ts) stored in the driving step period memory unit 56 and starts timing for the one-step time period (Ts) (Step 4 (S4)). At the same time, the drive signal output controller 53 transmits a drive control signal for driving the solid-state switching circuit 15 in the second motor driving mode according to the driving steps regulated by the second drive controller 21 (Step 5 (S5)).

Next, in Step 6 (S6), a judgement is made as to whether or not the time counting of the one-step time period (Ts) in the driving step period timer 57 started in Step 4 has completed. If the time period counting has not completed in Step 6 (S6), the sequence reverts to the start of Step 6 (S6). Namely, the time period counting continues. If it is determined that the time period counting has completed in Step 6 (S6), a deduction is made by one count from the number (Ns) set for counting in the driving step number counter 58 (Step 7 (S7)). In Step 8 (S8), if the left number of the driving step number counter 58 is other than zero (0), the sequence reverts to Step 4 (S4). If the left number of the driving step number counter 58 is zero (0) in Step 8 (S8), the sequence reverts to Step 1, as marked with "A" in FIG. 8, after resetting the driving step number counter 58 for the predetermined number (Ns), which is "three (3)" in the example provided (Step 9 (S9)).

The number (Ns) (e.g. "3") to be set and counted by the driving step number counter 25 is initially determined in a manner that the total time period of the one-step period (Ts) multiplied by the number (Ns) to be counted is greater than the difference between the two time constants before and after the change of the time constant of the phase-delay circuits 14. Provided, for example, that the time constants before and after the change of the time constant are 1.14 msec and 2.45 msec, respectively, the difference between the two time constants, before and after, is 1.31 msec. This matter will be further discussed below in more detail.

Figure 9A:
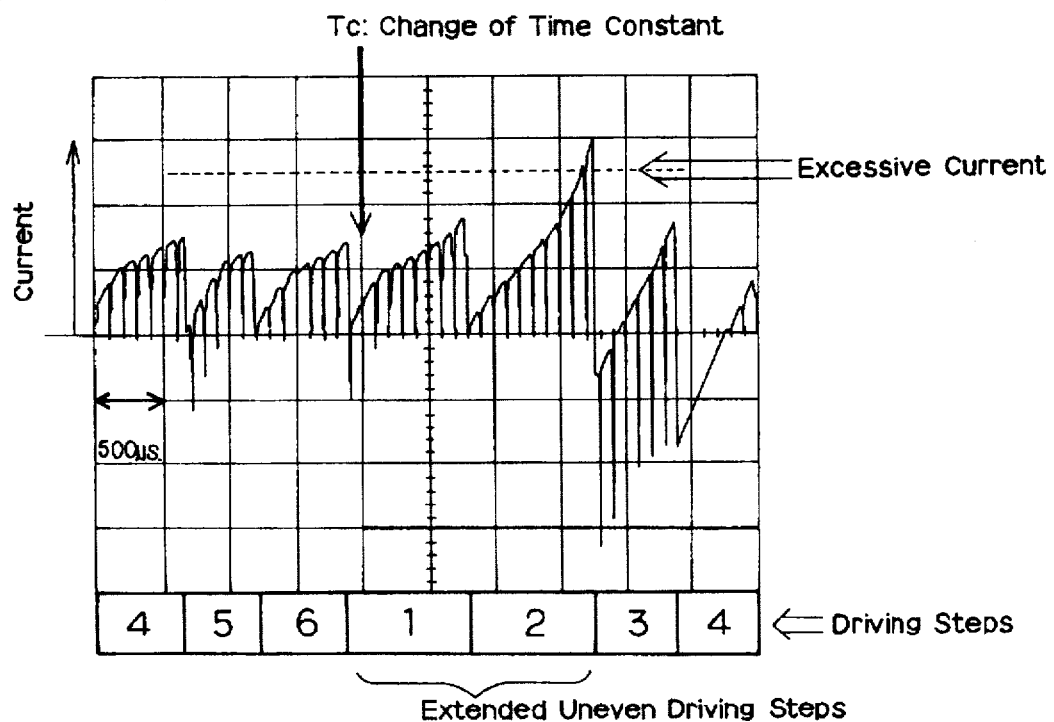
FIG. 9(a) and FIG. 9(b) are graphs showing amounts of motor driving currents, elapsed time and motor driving steps.
Figure 9B:
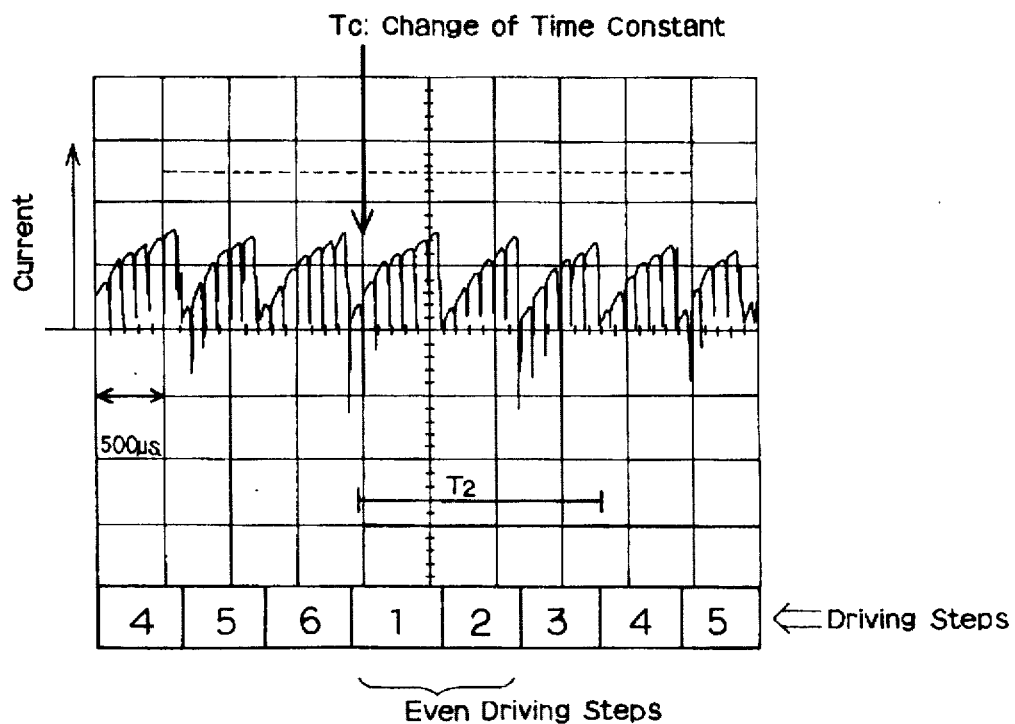

FIG. 9(a) and FIG. 9(b) are graphs showing, in the vertical axis varying amounts of the motor driving currents provided from the dc power supply 20 and measured by the current meter 18 and, in the horizontal axis, elapsed time and the motor driving steps, or switching steps, on which the solid-state switching elements of the switching circuit 15 are turned on or off. FIG. 9(a), which is provided for a comparison purpose, represents an unimproved case of motor drive control in which no second motor driving mode is involved. FIG. 9(b) is an improved case according to the present invention, in which both the first motor driving mode and the second motor driving mode are involved. Referring to FIG. 9(a), the driving step time periods immediately after the time (hereinafter identified as "Tc") when the time constant of the phase-delay circuits is changed are substantially longer than those before the time constant is changed. On the other hand, in FIG. 9(b), little change is observed as to the driving step time periods before and after the time (Tc) when the time constant of the phase-delay circuits is changed.

In both FIGS. 9(a) and 9(b), it is assumed, as an example, that the brushless motor has a 4-pole rotor and the rotational speed of the rotor is about 8,000 rpm. Under this rotational speed, the driving step time period (Ts) is obtained as follows:
Number of Rotation of Rotor per Second: $8,000/60=133.3$
Time Period per Rotation: $1/133.3=7.50$ msec In the case of a brushless motor, having 3-phase stator windings and a 4-pole permanent-magnet rotor, 12 driving steps will make one rotation of the rotor. One six-step cycle shown in FIGS. 9(a) and 9(b) will make one half rotation. Therefore:
Driving Step Time Period (Ts): 7.50 msec/12=625 μsec As mentioned before, the difference between the exemplified two time constants before and after the change of the time constant is 1.31 msec. Whereas, 625 μsec×2=1,250 μsec <1.31 msec
625 μsec×3=1,875 μsec >1.31 msec Since the accumulative time period of three driving steps exceeds the difference (1.31 msec) of the time constants before and after the change of the time constant, it is desirable to adopt the number of three (3) for the number (Ns) to be counted by the driving step number counter 58, as already mentioned above.

Referring back to FIG. 9(a), in the case of an unimproved motor drive control, it will be understood from the graph that excessive motor driving currents, which are as large as three times the normal amount of current, are shown after the time constant of the phase-delay circuits is changed. Furthermore, it is also shown in FIG. 9(a) that the driving step time periods become longer immediately after the time constant is changed as compared with the normal driving step time periods before the change of the time constant. The electric angles of the normal driving step time periods are in the range of 40° to 60°. However, the electric angles of those immediately after the change of the time constant increase by about 20° to become about 80°. As opposed to this example, in the case an improved control apparatus according to the present invention, as shown in FIG. 9(b), little change is observed in both the motor driving currents and the driving step time periods before and after the change of the time constant of the phase-delay circuits.

Figure 10A:
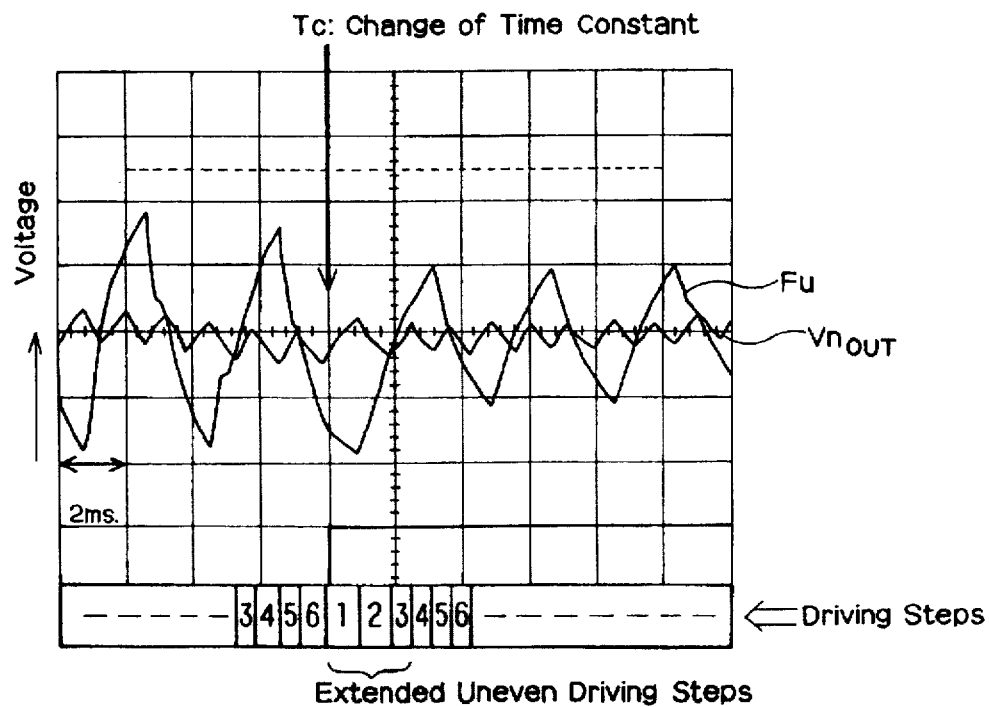
FIGS. 10(a) and 10(b) are graphs showing waveforms of output voltages of one of the phase-delay circuits and the comparator reference voltage computation circuit before and after the time constant of the phase-delay circuits is changed.
Figure 10B:
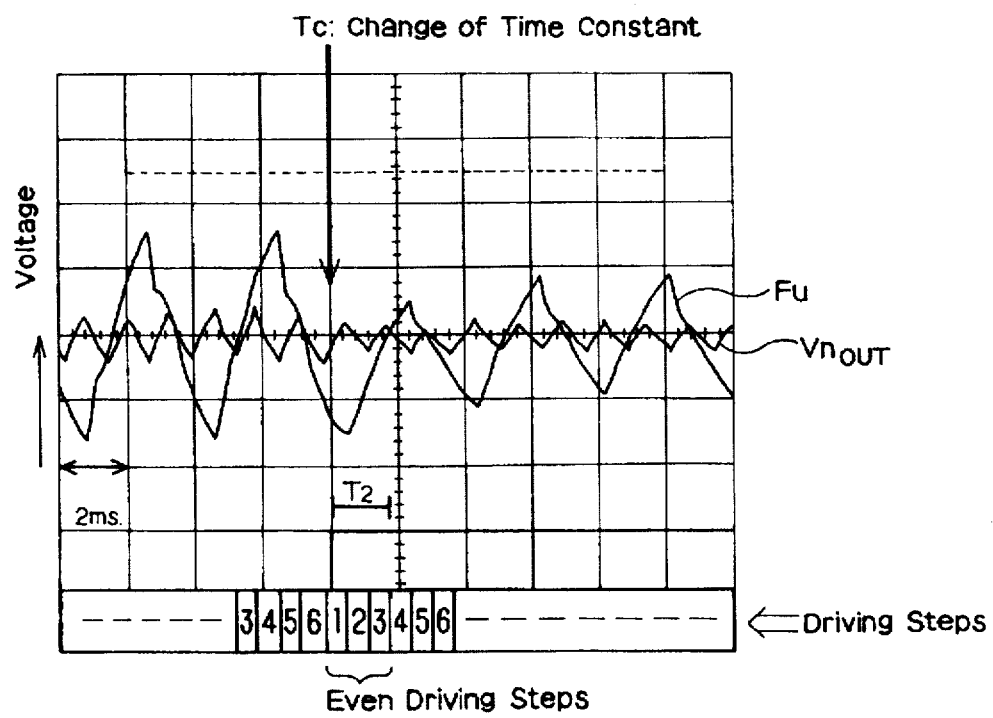

FIGS. 10(a) and 10(b) are graphs showing waveforms of output voltages of one of the phase-delay circuits and the comparator reference voltage computation circuit before and after the time constant of the phase-delay circuits is changed in the cases of using an unimproved drive control unit and the improved drive control unit 50 according to the present invention, respectively. The waveform Fu represents an output voltage of one of the phase-delay circuits and the waveform VnOUT represents a sawtooth output voltage of the comparator reference voltage computation circuit. In both the graphs, the horizontal axis represents elapsed time and the motor driving step periods and the vertical axis represents voltage.

In reference to both FIGS. 10(a) and 10(b), it will be understood that because the waveform and the slopes of the output voltage (Fu) of the phase-delay circuit change after the time (Tc) of the change of time constant, the timings when the phase-delay circuit output voltage (Fu) becomes even with the comparator reference voltage (VnOUT) shift. In the unimproved case, because of these shiftings of the timings, the time periods of the motor driving steps are extended immediately after the time (Tc) of the change of time constant, as shown in FIG. 10(a). Under such situation, the angular positions of the rotating rotor will not be precisely detected. This in turn will cause the electric angles of the driving step periods come off a regularable electric angle range (i.e. 40–60°), resulting in an excessive amount of motor driving current.

On the other hand, in reference to FIG. 10(b), in the case the drive control unit 50 is used according to the present invention, although the waveform and the slopes of the output voltage of the phase-delay circuits 14 change immediately after the time (Tc) of the change of time constant, the motor driving step periods are unchanged and not affected by the change of the waveform of the phase-delay circuit output voltage (Fu). In this case, the driving step periods are maintained constant because each of the driving step periods, immediately after the change of the time constant, is the same driving step time period (Ts) as of the driving step stored in the driving step period memory unit 56, which is nothing but the driving step immediately before the time (Tc) of the change of time constant. The driving step period is timed by the driving step period timer 57 and the number of steps is counted by the driving step number counter 58 for the accumulative period (T2), which is the time period for the second motor driving mode. According to the example explained above and shown in FIG. 10(b), the number (Ns) of driving steps counted by the driving step number counter 58 is three (3). At tire end of the period T2, the driving mode selection unit 54 selects the first drive controller 51 so that the driving mode reverts from the second motor driving mode to the first motor driving mode, in which the driving steps are determined according to the output signals of the voltage comparators 22.

Figure 11:
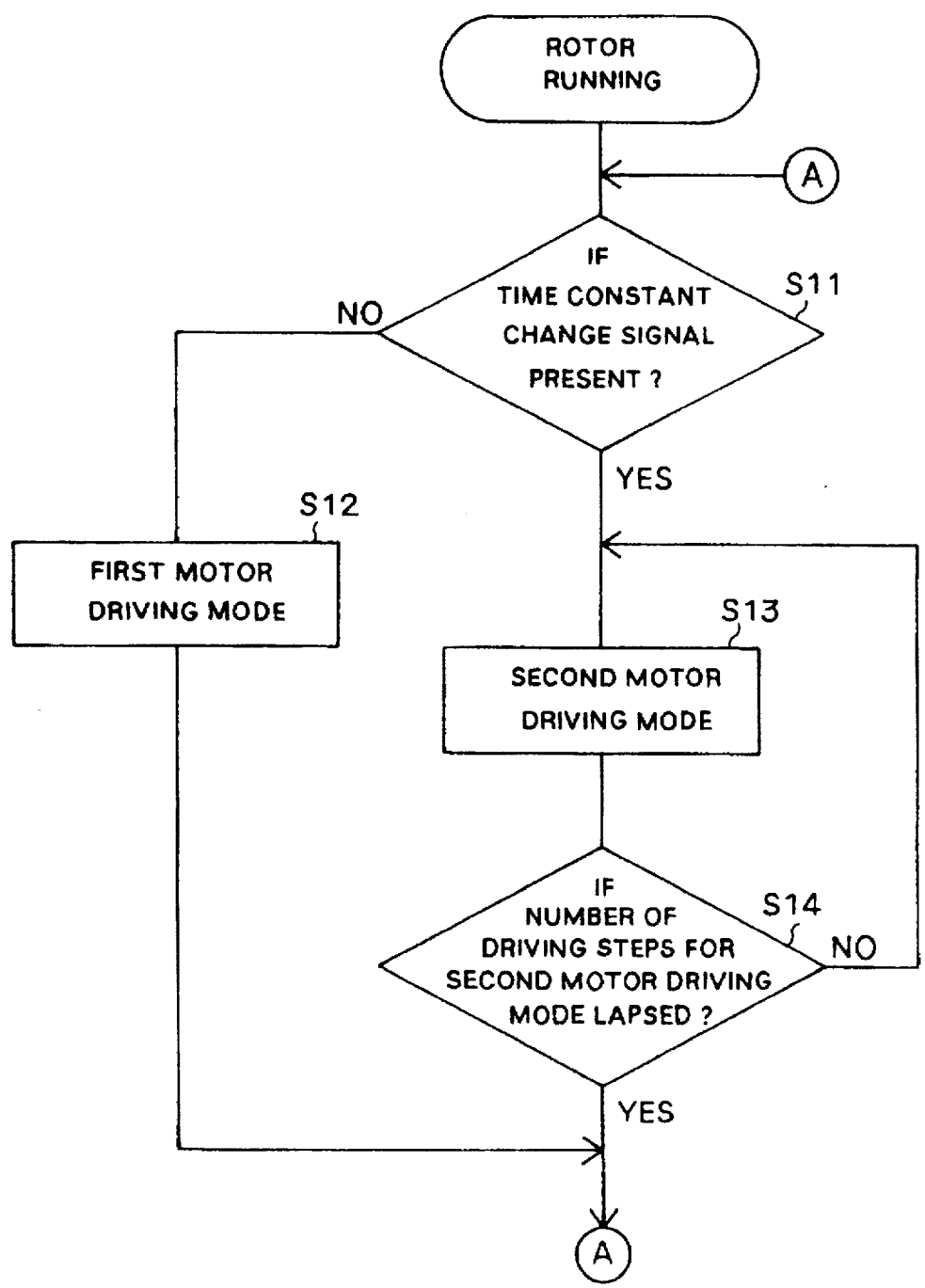
FIG. 11 is an flowchart showing the function of the motor control apparatus according to an alternative embodiment of the present invention.

The present invention shall not be limited to the embodiment described above. As an alternative embodiment, the driving step period memory unit 56, the driving step period timer 57, and the driving step number counter 58, as shown in FIG. 7, may be omitted. FIG. 11 is an flowchart showing the function of the motor control apparatus according to such an alternative embodiment of the present invention.

Referring to FIG. 11, in this alternative case, a judgement is made as to whether or not the time constant change signal is present by the driving mode selection unit 54 while the rotor is running (Step 11 (S11)). If no time constant change signal is present, the first drive controller 51 is selected and the motor is controlled in the first motor driving mode, as described above (Step 12 (S12)). If the time constant change signal is detected in Step 11, the second drive controller 52 is selected and the motor is controlled in the second motor driving mode, as also described above Step 13 (S13)). In this case of the alternative embodiment the second drive controller 52 is preprogrammed so as to always transmit a drive control signal to the drive signal output controller 53 according to a predetermined driving step time period (e.g. 625 μsec, in case of a 4-pole rotor) and a predetermined driving step number (e.g. "3"). In Step 14 (S14), a judgement is made as to whether or not the second motor driving mode for the predetermined number of driving steps has been completed. If completed, the sequence reverts to Step 11 (S11), as marked with "A" in FIG. 11.

It should also be understood that various changes and modifications may be made in the above described embodiments which provide the characteristics of the present invention without departing from the spirit and principle thereof particularly as defined in the following claims.

What is claimed is:

1. A method of driving and controlling a brushless dc motor including
   3-phase stator windings having respective winding terminals and a permanent-magnet rotor that is rotated by a rotating magnetic flux generated by the stator windings when energized, the method comprising the steps of:
   (a) connecting an electronic switching circuit to a dc power supply that provides a motor drive voltage and a midpoint voltage that is one half of said motor drive voltage for switching said motor drive voltage to produce 3-phase dc voltages;
   (b) applying said 3-phase dc voltages to the 3-phase stator windings individually to energize the windings so as to rotate the rotor;
   (c) obtaining 3-phase back emf voltages from the 3-phase windings individually while the rotor is in rotation;
   (d) providing said 3-phase back emf voltages to 3-phase phase-delay circuits individually to delay phases of said 3-phase back emf voltages by an electric angle of less than 90 so as to obtain 3-phase phase-delayed voltages therefrom;
   (e) connecting said 3-phase phase-delay circuits to 3-phase voltage comparators individually, each of said 3-phase voltage comparators having a first input terminal, a second input terminal and an output terminal, said first input terminals being individually connected to output terminals of said phase-delay circuits so that said 3-phase phase-delayed voltages are individually provided to said first input terminals;
   (f) providing said midpoint voltage to a comparator reference voltage computation circuit for outputting a sawtooth-wave comparator reference voltage having a frequency proportional to a current angular speed of the rotor and an amplitude whose center voltage is equal to said midpoint voltage;
   (g) providing said comparator reference voltage commonly to all of said second input terminals of said voltage comparators so as to obtain 3-phase comparator output voltages from said comparators;
   (h) providing said 3-phase comparator output voltages individually to a drive control unit, which is a microcomputer;
   (i) obtaining in said drive control unit switching control signals in sequential driving steps having driving step periods according to said 3-phase comparator output voltages;
   (j) providing said switching control signals in sequential driving steps to said electronic switching circuit so that said electronic switching circuit performs commutation of said motor drive voltage in a first motor driving mode;
   (k) monitoring a rotational speed of the rotor;
   (l) increasing time constant of all of said phase-delay filter circuits when said monitored rotor speed is below a predetermined speed;
   (m) monitoring an amount of motor drive current supplied from said dc power supply;
   (n) increasing time constant of all of said phase-delay circuits when said monitored amount of motor drive current is above a predetermined amount;
   (o) switching from said first motor driving mode, which is dependent of said 3-phase comparator output voltages, to a second motor drive mode, which is independent of said 3-phase comparator output voltages, for a predetermined time period that equals to a predetermined one driving step time period multiplied by a predetermined number of driving steps when the time constant of said phase-delay circuits is increased; and
   (p) reverting from said second motor driving mode to said first motor driving mode when said predetermined time period of said second motor driving mode has lapsed.

2. A method of driving and controlling a brushless dc motor including
   3-phase stator windings having respective winding terminals and a permanent-magnet rotor that is rotated by a rotating magnetic flux generated by the stator windings when energized, the method comprising the steps of:
   (a) connecting an electronic switching circuit to a dc power supply that provides a motor drive voltage and a midpoint voltage that is one half of said motor drive voltage for switching said motor drive voltage to produce 3-phase dc voltages;
   (b) applying said 3-phase dc voltages to the 3-phase stator windings individually to energize the windings so as to rotate the rotor;
   (c) obtaining 3-phase back emf voltages from the 3-phase windings individually while the rotor is in rotation;
   (d) providing said 3-phase back emf voltages to 3-phase phase-delay circuits individually to delay phases of said 3-phase back emf voltages by an electric angle of less than 90 so as to obtain 3-phase phase-delayed voltages therefrom;
   (e) connecting said 3-phase phase-delay circuits to 3-phase voltage comparators individually, each of said 3-phase voltage comparators having a first input terminal, a second input terminal and an output terminal, said first input terminals being individually connected to output terminals of said phase-delay circuits so that said 3-phase phase-delayed voltages are individually provided to said first input terminals;
   (f) providing said midpoint voltage to a comparator reference voltage computation circuit for outputting a sawtooth-wave comparator reference voltage having a frequency proportional to a current angular speed of the rotor and an amplitude whose center voltage is equal to said midpoint voltage;

(g) providing said comparator reference voltage commonly to all of said second input terminals of said voltage comparators so as to obtain 3-phase comparator output voltages from said comparators;

(h) providing said 3-phase comparator output voltages individually to a drive control unit, which is a microcomputer;

(i) obtaining in said drive control unit switching control signals in sequential driving steps having driving step periods according to said 3-phase comparator output voltages;

(j) providing said switching control signals in sequential driving steps to said electronic switching circuit so that said electronic switching circuit performs commutation of said motor drive voltage in a first motor driving mode;

(k) monitoring a rotational speed of the rotor;

(l) increasing time constant of all of said phase-delay filter circuits when said monitored rotor speed is below a predetermined speed;

(m) monitoring an amount of motor drive current supplied from said dc power supply;

(n) increasing time constant of all of said phase-delay circuits when said monitored amount of motor drive current is above a predetermined amount;

(o) storing in a memory unit datum of each of said driving step time periods consecutively in a refreshing manner;

(p) reading the last driving step time period stored in said memory unit when said time constant is increased;

(q) multiplying said last driving step time period by a predetermined number of steps to obtain a time period for a second motor driving mode;

(r) switching from said first motor driving mode, which is dependent of said 3-phase comparator output voltages, to a second motor drive mode, which is independent of said 3-phase comparator output voltages, for said time period for said second motor driving mode when the time constant of said phase-delay circuits is increased;

(s) providing switching control signals in sequential driving steps for said second motor driving mode to said electronic switching circuit so that said electronic switching circuit performs commutation of said motor drive voltage in said second motor driving mode, each of said sequential driving steps for said second motor driving mode having a time period that is equal to said last driving step time period stored in said memory unit; and (t) reverting from said second motor driving mode to said first motor driving mode when said time period for said second motor driving mode has lapsed.

3. A method of driving and controlling a brushless dc motor according to claim 2, wherein said time period for said second motor driving mode is greater than a difference between a first time constant of said phase-delay circuits before the time constant thereof is increased and a second time constant of said phase-delay circuits after the time constant thereof is increased.

* * * * *